United States Patent [19]
Hall

[11] 4,265,477
[45] May 5, 1981

[54] FOLDING SIDEBOARD GOOSENECK TRAILER

[76] Inventor: Thornton D. Hall, Rte. 2, Ft. Cobb, Okla. 73038

[21] Appl. No.: 55,106

[22] Filed: Jul. 5, 1979

[51] Int. Cl.³ .............................................. B60P 3/04
[52] U.S. Cl. ..................................................... 296/14
[58] Field of Search ..................................... 296/10–14

[56] References Cited

U.S. PATENT DOCUMENTS

| 1,443,468 | 1/1923 | Goss ..................................... 296/14 |
| 1,587,552 | 6/1926 | Press ..................................... 296/13 |
| 1,893,532 | 1/1933 | Ball ........................................ 296/10 |
| 2,557,347 | 6/1951 | Haynes .................................. 296/10 |
| 2,720,413 | 10/1955 | Halverson ............................. 296/10 |

*Primary Examiner*—Robert R. Song
*Attorney, Agent, or Firm*—Robert K. Rhea

[57] ABSTRACT

An elongated twin beam frame trailer having a gooseneck trailer hitch assembly at its forward end is provided with sectionalized hingedly mounted box forming sideboards. Opposing sideboard sections, when folded inwardly, form a flatbed trailer configuration in one position and form a V-shaped support floor transversely of the trailer when folded to another position. End gates close the respective ends of the trailer or divide the trailer intermediate its ends.

5 Claims, 6 Drawing Figures

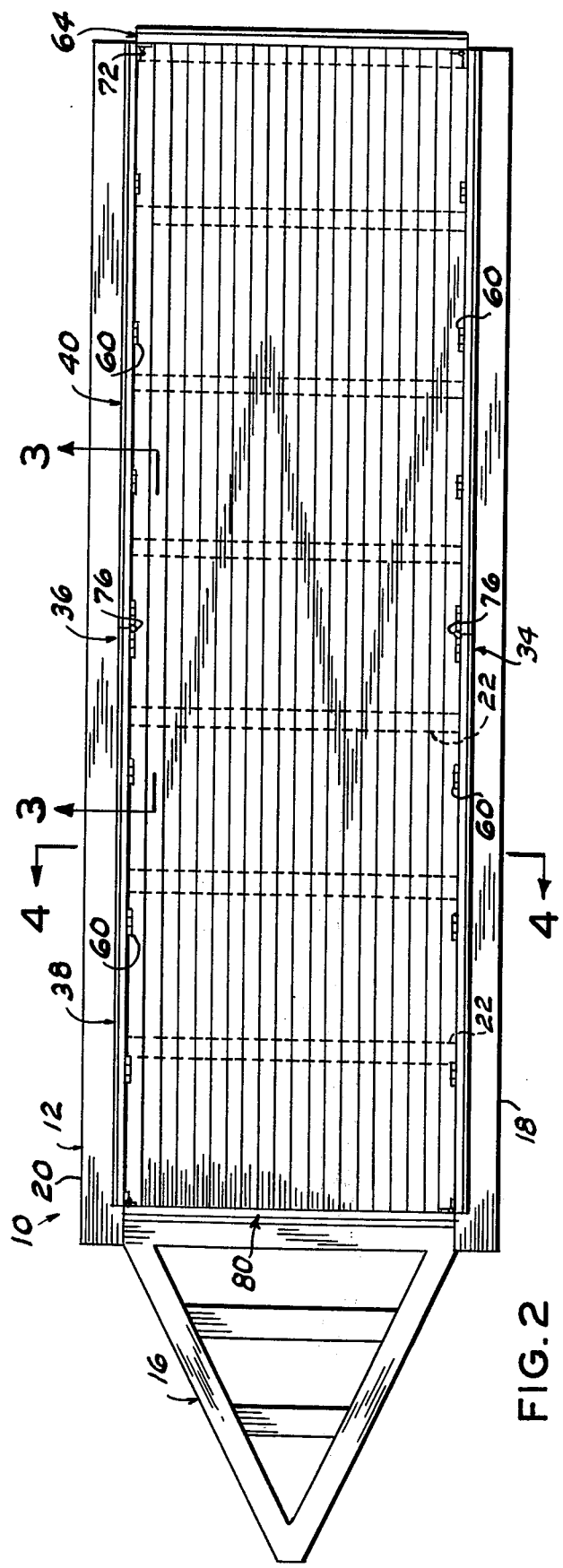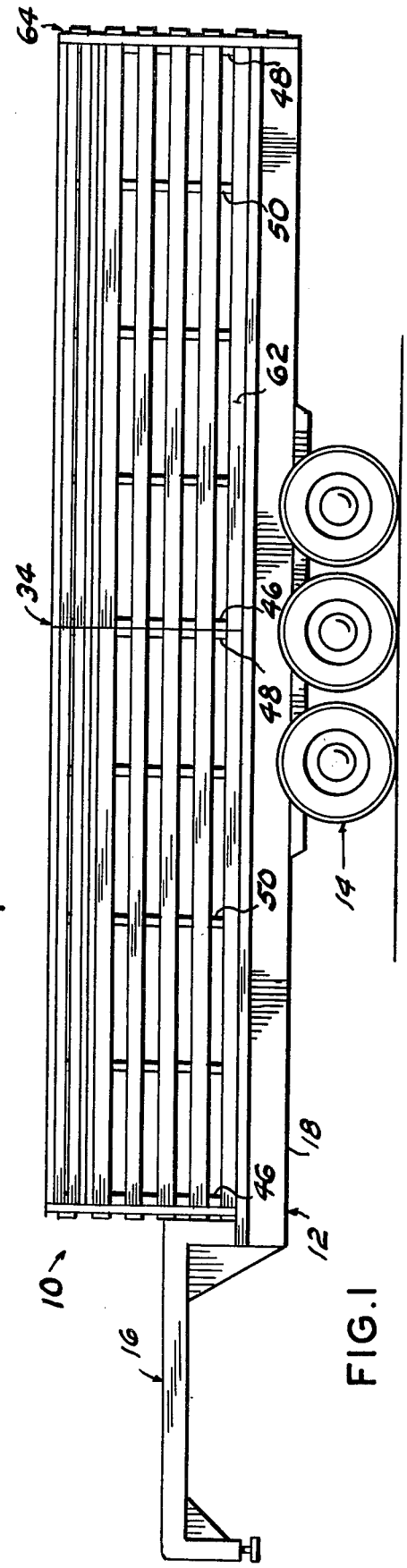

FOLDING SIDEBOARD GOOSENECK TRAILER

BACKGROUND OF THE INVENTION

1. Field of the Invention

The present invention relates to trailers and more particularly to a trailer having a gooseneck trailer hitch and sectionalized sideboards foldable to form a flatbed trailer.

In hauling farm produce to the market it is desirable to have a trailer capable of being towed by a pickup truck, or the like, with the trailer having sectionalized sideboards capable of retaining live stock therein and in which selective sections may be folded inwardly to provide a flatbed configuration, such as for hauling live stock in one closed end portion of the trailer and simultaneously hauling bulk material, such as baled hay on the flatbed portion at its other end.

2. Description of the prior art

Prior patents such as U.S. Pat. Nos. 337,105; 2,015,879 and 2,720,413 generally disclose trailers having inwardly folding sideboards and end gates as in U.S. Pat. No. 2,720,413 but none of these patents disclose folding selected sections of the sideboards inwardly to form a flatbed configuration or a transverse V-shaped floor coextensive with the trailer or either of its end portions.

SUMMARY OF THE INVENTION

This trailer comprises an elongated trailer frame defined by spaced-apart triangular box-shape beams rigidly interconnected by cross members supporting the trailer floor or bed and includes a gooseneck trailer hitch assembly at its forward end. A plurality of trailer sideboard sections coextensive with the trailer frame beams are hingedly connected thereto throughout their length for inward folding of the sideboard sections toward each other from a box forming to flatbed configuration. Each trailer sideboard section is characterized by a coextensive hingedly connected top portion for supporting the respective folded sideboard sections in the horizontal plane defined by the upper limit of the frame beam members when in one position. The sideboard top portions may be further folded toward the trailer bed to define a transverse widened V-shape trailer floor.

The principal object of this invention is to provide a farm produce transporting trailer having sectionalized hingedly connected sideboards capable of being folded to define a flatbed or transverse V-shaped bed throughout its length or at either of its respective end portions.

BRIEF DESCRIPTION OF THE DRAWINGS

FIG. 1 is a side elevational view of the trailer;

FIG. 2 is a top view of FIG. 1;

DESCRIPTION OF THE PREFERRED EMBODIMENT

Figure 3:
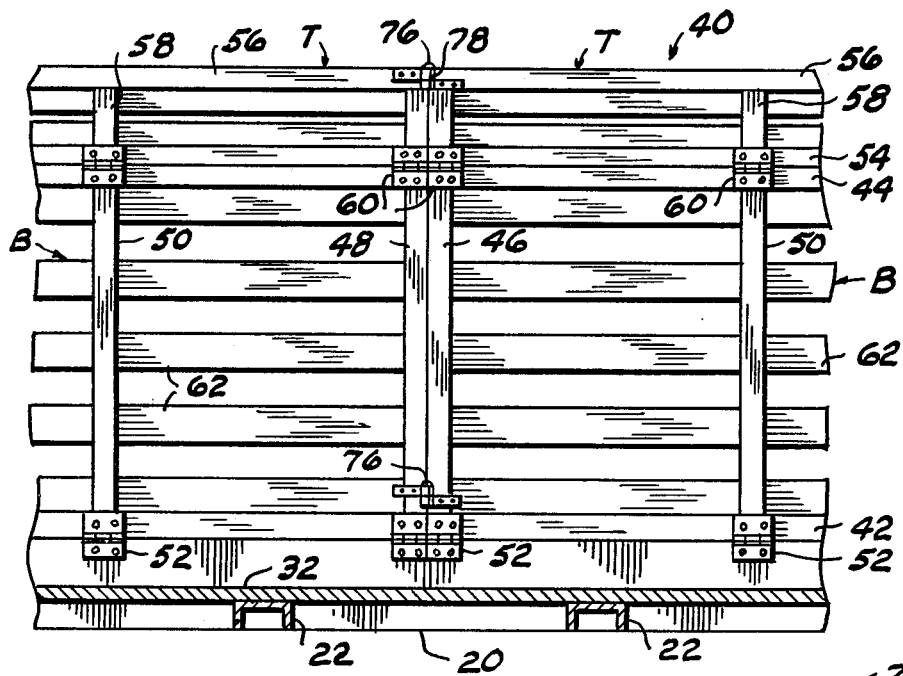
FIG. 3 is a fragmentary elevational view, partially in section, to a larger scale, looking in the direction of the arrows 3—3 of FIG. 2.
Figure 6:
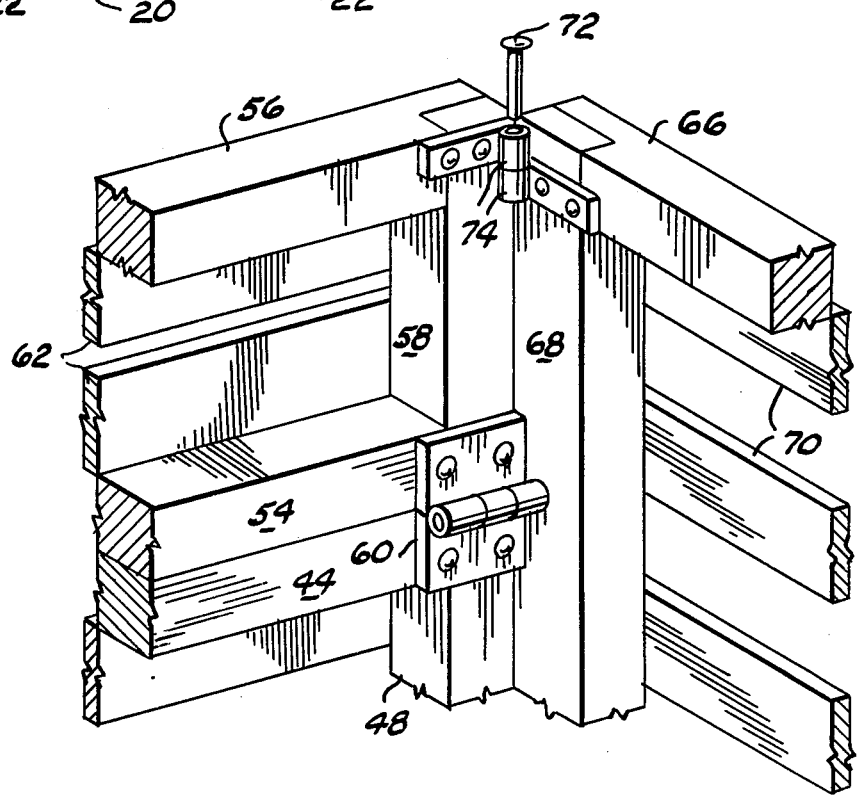

Like characters of reference designate like parts in those figures of the drawings in which they occur.

In the drawings:

The reference numeral 10 indicates the trailer, as a whole, which is elongated rectangular in general configuration. The trailer 10 includes a frame 12 supported by a plurality of axles and wheels 14 and a gooseneck-type trailer hitch assembly 16 at its forward end.

Figure 4:
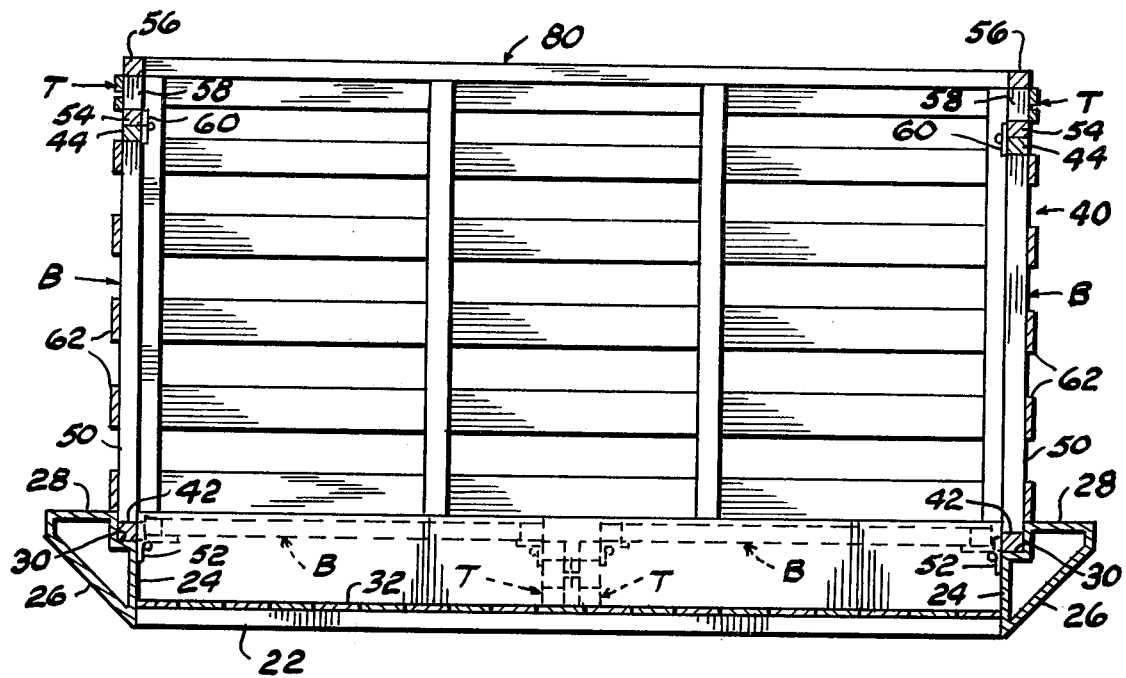
FIG. 4 is a vertical cross sectional view, to a similar scale, taken substantially along the line 4—4 of FIG. 2 and illustrating by dotted lines, the sideboards folded to form the flatbed configuration of the trailer.
Figure 5:
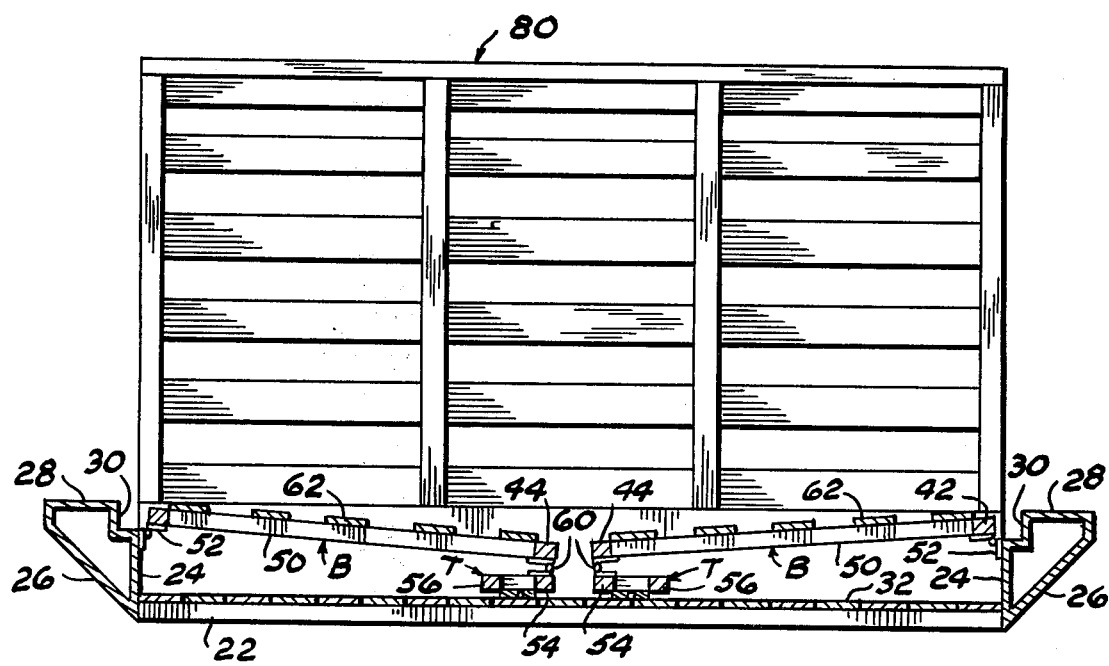
FIG. 5 is a view similar to FIG. 4 illustrating the sideboard folded V-shape trailer bed configuration; and, FIG. 6 is a fragmentary perspective view, to a further enlarged scale, of one rearward inside corner portion of the trailer.

The frame 12 is formed by a pair of elongated beams 18 and 20 interconnected adjacent their depending limit by a plurality of frame cross members 22. As shown by FIGS. 4 and 5, the beams 18 and 20 are substantially triangular box-shaped in transverse section defined by an inward vertically disposed wall 24 and an opposite upwardly and outwardly diverging wall 26 joined by a horizontal top wall 28. The beams are further characterized by a coextensive right angular rabbeted edge or recess 30 at the juncture of the walls 24 and 28 for the purpose presently explained.

A plurality of longitudinally extending juxtaposed boards 32, or the like, overlie the frame cross members 22 to form the trailer bottom or bed. The trailer further includes opposing pairs of sideboards, indicated generally at 34 and 36. The sideboards 34 and 36 are substantially identical and in the interest of brevity only one of the pair of sideboards 36 is described in detail. The pair of sideboards 36 is preferably formed by substantially identical forward and rearward sections 38 and 40, respectively. The section 40 includes a bottom portion B and a top portion T. The bottom portion B is formed by a base bar 42 and a top bar 44 maintained in vertical spaced parallel relation by forward and rearward end standards 46 and 48 and a plurality of intermediate equally spaced-apart standards 50. The base bar 42 is cooperatively nested by the beam recess 30 and is hingedly connected to the beam wall 24 by a plurality of hinges 52 at the position of the respective standard thus permitting inward pivoting movement of the section 40 from a vertical position toward and away from the trailer bed 32. The sideboard top portion T is similarly formed by lower and upper rails 54 and 56, respectively which are interconnected by end and intermediate spacers 58 vertically aligned with the respective bottom portion standards. The top portion lower rail 54 overlies and is hingedly connected with the sideboard bottom portion top bar 44 by other strap hinges 60 at the juncture of the respective standards and spacers for the purposes presently explained. The vertical dimension of the bottom portion B is less than one-half the spacing between the frame beam vertical walls 24 a distance at least equal to the transverse dimension of the top portion bottom rail 54 for the purpose presently explained. A plurality of longitudinally extending vertically spaced-apart lath or strips 62 are secured to the respective standards and spacers to complete the sideboard section 40.

An end gate 64, having a width substantially equal to the spacing between the sideboards 34 and 36, closes the rearward end of the trailer and is similarly formed by top and bottom rails, only the top rail 66 being shown, similarly interconnected by a plurality of other standards 68 and having lath or strips 70 secured thereto in vertically spaced relation. The end gate is joined to the sideboard section 40 rearward standard 58 by pins 72 received by cooperatively aligned sleeves 74 rigidly secured to the end gate and standard, respectively. Other pins 76, entering aligned sleeves 78, similarly secured to the abutting end standards of the respective sideboard sections 38 and 40 join the sections when in upstanding box forming position. The front end gate 80 is substantially identical with the rear end gate 64 and is permanently secured to the gooseneck trailer members by bolts, not shown.

Operation

In operation, when it is desired to convert the trailer 10 to a flatbed-type trailer the end gate and sideboard securing pins 76 and 72 are removed and the rear end gate supported by the upper surface of the gooseneck trailer. The respective opposing sideboard sections are pivoted inwardly toward each other with the hinged top portion T of each section vertically juxtaposed and supported by the trailer bed 32 so that the bottom section B of each sideboard section is horizontally disposed, as shown by dotted lines (FIG. 4).

As illustrated by FIG. 5, the sideboard sections may be further lowered to define a widened V-shaped supporting surface by further pivoting the sideboard top portions T away from each other to flatly overlie the trailer bed 32 thus disposing the trailer side-board bottom portions B in downwardly converging relation.

A third end gate or transverse partition, not shown, but identically formed with respect to the end gate 64, is preferably provided. With the forward or rearward opposing sideboard sections folded to a flatbed configuration, the partition is used to close the ends of the remaining upright sideboards, such as for holding live stock in the upright sideboard surrounded end portion of the trailer and hauling bulk material, such as hay, or the like, on the flatbed section of the trailer.

Obviously the invention is susceptible to changes or alterations without defeating its practicability. Therefore, I do not wish to be confined to the preferred embodiment shown in the drawings and described herein.

I claim:

1. A folding sideboard trailer, comprising:
   trailer frame means defined by spaced-apart elongated beams interconnected adjacent their depending limit to form a trailer bed;
   opposing pairs of sideboard sections hingeldy connected with said trailer box wall forming position to a trailer flatbed position overlying said trailer bed,
   each section of said pairs of sections having a bottom portion hingedly connected with the upper limit of the respective said beams and having a coextensive top portion hingedly connected with the upper limit of said bottom portion for vertical pivoting movement of said top portion toward and away from said trailer bed from the plane of said bottom portion,
   said hinged top portion having a vertical dimension substantially equal to the vertical dimension of the elongated beams and forming a support extending vertically between said trailer bed and said bottom portion when said bottom portion is in said flatbed position; and,
   end gate means extending between said sideboard sections when the latter are in said box wall position.

2. The trailer according to claim 1 in which the vertical dimension of said bottom portions is a function of the spacing between said beams such that opposing said top portions are disposed adjacent each other when said sideboard sections are in flatbed position.

3. The trailer according to claim 1 in which said top portion is characterized by a side surface longitudinally flatly overlying
   said trailer bed when said top portion is in another position,
   said top portion supporting said bottom portion in a plane inclined downwardly toward the central portion of said trailer bed when in said another position.

4. The trailer according to claim 2 or 3 in which said beams are characterized by a vertical wall facing inwardly of the trailer and a horizontal upper wall joined to said vertical wall by a rabbeted edge surface forming an elongated recess cooperatively nesting the longitudinal depending edge portion of the respective said sideboard section.

5. The trailer according to claim 4 and further including:
   aligned sleeve and pin means connected with the respective said section and said end gates for connecting said sections with each other and said end gates when in trailer box wall forming position.

* * * * *

UNITED STATES PATENT OFFICE
CERTIFICATE OF CORRECTION

PATENT NO. : 4,265,477
DATED : May 5, 1981
INVENTOR(S) : Thornton D. Hall

It is certified that error appears in the above-identified patent and that said Letters Patent are hereby corrected as shown below:

Claim 1, line 6, of the claim, should read

--nected with said beams for vertical pivoting movement from an upstanding trailer box wall forming position--.

Signed and Sealed this

Fourteenth Day of July 1981

[SEAL]

Attest:

Attesting Officer

GERALD J. MOSSINGHOFF

Commissioner of Patents and Trademarks